United States Patent
Sun et al.

(10) Patent No.: US 11,338,227 B2
(45) Date of Patent: May 24, 2022

(54) MANIFOLD ASSEMBLY AND METHOD OF USE

(71) Applicant: Pall Corporation, Port Washington, NY (US)

(72) Inventors: Peng Sun, Zouping (CN); Kurt E. Brown, Cortland, NY (US)

(73) Assignee: Pall Corporation, Port Washington, NY (US)

( * ) Notice: Subject to any disclaimer, the term of this patent is extended or adjusted under 35 U.S.C. 154(b) by 341 days.

(21) Appl. No.: 16/528,823

(22) Filed: Aug. 1, 2019

(65) Prior Publication Data

US 2021/0031126 A1   Feb. 4, 2021

(51) Int. Cl.
*B01D 29/96* (2006.01)
*F16L 37/08* (2006.01)

(52) U.S. Cl.
CPC ...... *B01D 29/96* (2013.01); *B01D 2201/0415* (2013.01); *B01D 2201/4061* (2013.01); *F16L 37/08* (2013.01)

(58) Field of Classification Search
CPC .... B01D 2201/0415; B01D 2201/4023; B01D 2201/4061; B01D 29/96; F16L 37/08
See application file for complete search history.

(56) References Cited

U.S. PATENT DOCUMENTS

| | | | |
|---|---|---|---|
| 6,652,749 B2 | 11/2003 | Stankowski et al. | |
| 7,338,599 B2 * | 3/2008 | Hiranga | B01D 29/15 210/232 |
| 2001/0045386 A1 * | 11/2001 | Stankowski | B01D 29/96 210/235 |
| 2002/0125183 A1 | 9/2002 | Chaney et al. | |
| 2008/0164197 A1 * | 7/2008 | Hiranaga | B01D 35/30 210/232 |
| 2012/0144855 A1 | 6/2012 | Krause et al. | |
| 2013/0228509 A1 | 9/2013 | Kuruc | |
| 2019/0374887 A1 | 12/2019 | Kinjo | |

FOREIGN PATENT DOCUMENTS

| | | |
|---|---|---|
| CN | 1781575 A | 6/2006 |
| CN | 101198390 A | 6/2008 |
| CN | 107725812 A | 2/2018 |

OTHER PUBLICATIONS

Singapore Intellectual Property Office, Search Report in counterpart Singapore Patent Application No. 10202007214T, dated Jul. 28, 2021.
China National Intellectual Property Administration, Office Action in counterpart Chinese Patent Application No. 202010759783.7, dated Oct. 9, 2021.

* cited by examiner

*Primary Examiner* — Dirk R Bass
(74) *Attorney, Agent, or Firm* — Leydig Voit & Mayer, Ltd.

(57) ABSTRACT

A manifold assembly and a method of engaging a filter capsule in the manifold assembly are provided.

8 Claims, 10 Drawing Sheets

MANIFOLD ASSEMBLY AND METHOD OF USE

BACKGROUND OF THE INVENTION

Manifold assemblies can be used for change-outs of filters. However, there is a need for improved manifold assemblies.

BRIEF SUMMARY OF THE INVENTION

An embodiment of the invention provides a manifold assembly for use with a filter capsule having a first fitting and a second fitting, the manifold assembly comprising (a) an upper adjustable frame arrangement comprising a front wall having a top end and a bottom end, the bottom end including a slot; a movable hollow fluid flow channel including a first fitting fluid flow port, a linkage and a handle, wherein the linkage is engaged with the movable hollow fluid flow channel and the handle, such that the first fitting fluid flow port is vertically movable with the movable hollow fluid flow channel between a first fitting engagement position and a first fitting disengagement position upon movement of the handle; (b) a lower frame arrangement comprising a through hole for receiving the second fitting; (c) a manifold frame connected to the upper adjustable frame arrangement and connected the lower frame arrangement; and, (d) a filter housing support connected to the manifold frame between the upper adjustable frame arrangement and the lower frame arrangement.

In another embodiment, a method for engaging a filter capsule in a manifold assembly is provided, the method comprising placing a filter capsule having a first fitting and a second fitting into a manifold assembly comprising (a) an upper adjustable frame arrangement comprising a front wall having a top end and a bottom end, the bottom end including a slot; a movable hollow fluid flow channel including a first fitting fluid flow port, a linkage and a handle, wherein the linkage is engaged with the movable hollow fluid flow channel and the handle, such that the first fitting fluid flow port is vertically movable with the movable hollow fluid flow channel between a first fitting engagement position and a first fitting disengagement position upon movement of the handle; (b) a lower frame arrangement comprising a through hole for receiving the second fitting; (c) a manifold frame connected to the upper adjustable frame arrangement and connected the lower frame arrangement; (d) a filter housing support connected to the manifold frame between the upper adjustable frame arrangement and the lower frame arrangement; placing the second fitting into the through hole of the lower frame arrangement; placing the first fitting into the slot of the upper adjustable frame arrangement; moving the handle such that the movable hollow fluid flow channel including the first fitting fluid flow port is moved into first fitting engagement position, and, forming radial seals between the first fitting and the movable hollow fluid flow channel and between the second fitting and a second fitting fluid flow port.

BRIEF DESCRIPTION OF THE SEVERAL VIEWS OF THE DRAWING(S)

FIG. 1 is a perspective view of a manifold assembly according to an embodiment of the invention, wherein the movable hollow fluid flow channel including the first fitting fluid port is in the first fitting engagement position, and is locked in position by the latch mechanism. FIG. 1 also shows illustrative upper and lower connection port fittings.

FIG. 6D also shows, diagrammatically, radial seals formed between the first fitting and the movable hollow fluid flow channel, and between the second fitting and the second fitting fluid flow port while in the first fitting engagement position.

DETAILED DESCRIPTION OF THE INVENTION

In accordance with an embodiment of the invention, a manifold assembly for use with a filter capsule having a first fitting and a second fitting comprises (a) an upper adjustable frame arrangement comprising a front wall having a top end and a bottom end, the bottom end including a slot; a movable hollow fluid flow channel including a first fitting fluid flow port, a linkage and a handle, wherein the linkage is engaged with the movable hollow fluid flow channel and the handle, such that the first fitting fluid flow port is vertically movable with the movable hollow fluid flow channel between a first fitting engagement position and a first fitting disengagement position upon movement of the handle; (b) a lower frame arrangement comprising a through hole for receiving the second fitting; (c) a manifold frame connected to the upper adjustable frame arrangement and connected the lower frame arrangement; and, (d) a filter housing support connected to the manifold frame between the upper adjustable frame arrangement and the lower frame arrangement.

In another embodiment, a method for engaging a filter capsule in a manifold assembly is provided, the method comprising placing a filter capsule having a first fitting and a second fitting into a manifold assembly comprising (a) an upper adjustable frame arrangement comprising a front wall having a top end and a bottom end, the bottom end including a slot; a movable hollow fluid flow channel including a first fitting fluid flow port, a linkage and a handle, wherein the linkage is engaged with the movable hollow fluid flow channel and the handle, such that the first fitting fluid flow port is vertically movable with the movable hollow fluid flow channel between a first fitting engagement position and a first fitting disengagement position upon movement of the handle; (b) a lower frame arrangement comprising a through hole for receiving the second fitting; (c) a manifold frame connected to the upper adjustable frame arrangement and connected the lower frame arrangement; (d) a filter housing support connected to the manifold frame between the upper adjustable frame arrangement and the lower frame arrangement; placing the second fitting into the through hole of the lower frame arrangement; placing the first fitting into the slot of the upper adjustable frame arrangement; moving the handle such that the movable hollow fluid flow channel including the first fitting fluid flow port is moved into first fitting engagement position, and, forming radial seals between the first fitting and the movable hollow fluid flow channel and between the second fitting and a second fitting fluid flow port.

Advantageously, filter capsules can be installed in a manifold assembly, readily connected and disconnected, and changed-out quickly in confined spaces. Additionally, filter capsules can be installed with an easy motion without individually connecting each filter capsule fitting to the manifold assembly.

Embodiments of the invention can be used with a variety of filters and filter capsules, including, for example, those available from Pall Corporation (East Hills, N.Y.). The filter and filter capsules are suitable for filtering a variety of fluids, including, but not limited to, a broad range of slurries and liquids, such as chemical mechanical planarization (CMP) slurries.

Each of the components of the invention will now be described in more detail below, wherein like components have like reference numbers.

Figure 1:
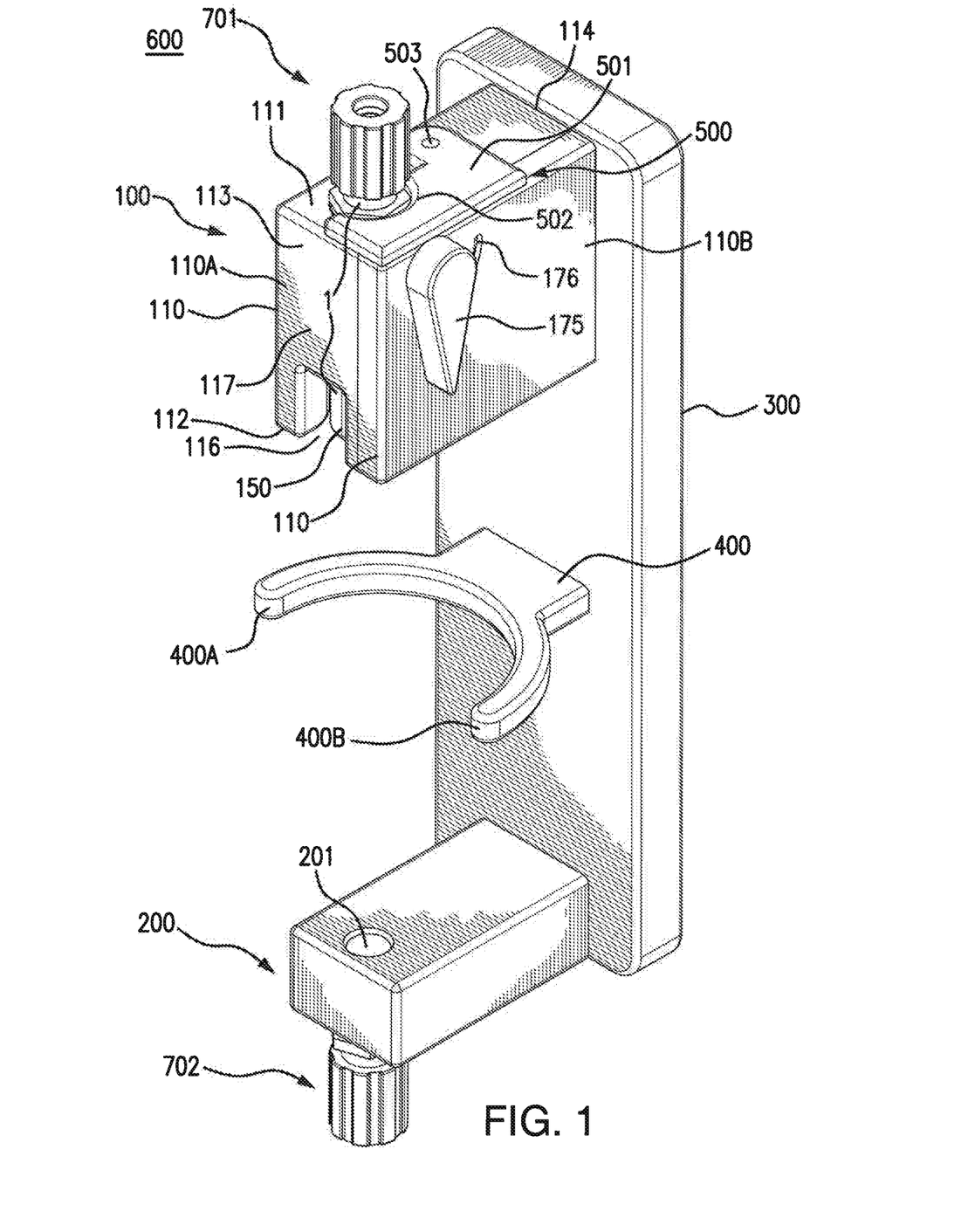
Figure 2:
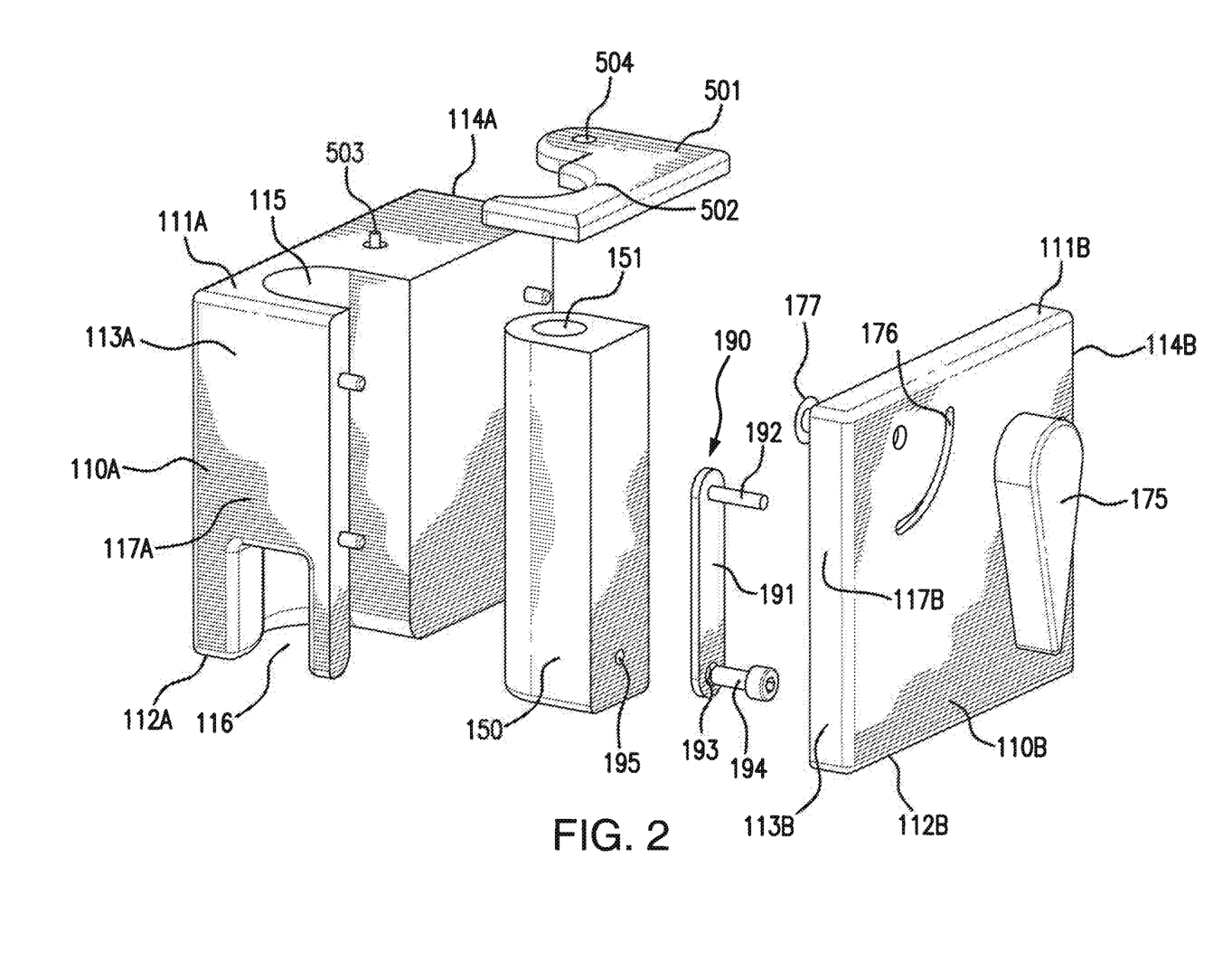
FIG. 2 is an exploded view of an upper adjustable frame arrangement in the manifold assembly shown in FIG. 1.

FIGS. 1 and 2 show an embodiment of a manifold assembly 600 comprising an upper adjustable frame arrangement 100 comprising a top end 111, a bottom end 112, a front 113, a back 114, a front wall 117 extending from the top end to the bottom end, the bottom end of the front wall including a slot 116; a recess 115 (FIG. 2) extending from the top end to the bottom end; a vertically movable hollow fluid flow channel 150 including a first fitting fluid flow port 151 (FIG. 2), wherein the movable hollow fluid flow channel moves in the recess; a linkage 190 (FIG. 2) and a handle 175, wherein the linkage is engaged with the movable hollow fluid flow channel and the handle, such that the first fitting fluid flow port is vertically movable with the movable hollow fluid flow channel between a first fitting engagement position 1 and a first fitting disengagement position 2 (shown in FIG. 5) upon movement of the handle; a lower frame arrangement 200 comprising a through hole 201 for receiving a second fitting of a filter capsule; a manifold frame 300 connected to the upper adjustable frame arrangement and connected the lower frame arrangement; and an optional filter housing support 400 connected to the manifold frame between the upper adjustable frame arrangement and the lower frame arrangement.

FIG. 1 also shows an upper connection port fitting 701 and a lower connection port fitting 702.

As will be discussed in more detail below, each of the upper and lower frame arrangements is configured for receiving a filter capsule fitting, via the slot 116 in the upper frame arrangement, and via the through hole 201 in the lower frame arrangement.

In the illustrated embodiment (shown in more detail in FIG. 2), the upper adjustable frame arrangement includes a first housing portion 110A and a second housing portion 110B, each including, respectively, a top end 111A, 111B, a bottom end 112A, 112B, a front 113A, 113B, a back 114A, 114B, and a front wall 117A, 117B. In this illustrated embodiment, the first housing portion includes the slot and the recess, and a second housing portion includes a curved cut-out 176 through which the linkage engages with the handle, and the movable hollow fluid flow channel is arranged between the first housing portion and the second housing portion.

A variety of configurations are suitable for providing the linkage 190 that is engaged with the movable hollow fluid flow channel and the handle, e.g., the linkage could include one or more gears. However, for ease of manufacturing and cost, a preferred linkage comprise a lever or rod. In the embodiment illustrated in FIG. 2, the linkage 190 comprises a lever or rod 191 with a pin or post at one end 192, that passes through the curved cut-out 176 to engage with the handle, the pin or post being movable along the curved cut-out as the handle moves; and a through hole 193 at the other end, wherein a retainer 194 such as a bolt or screw passes through the hole and attaches at 195 to the movable hollow fluid flow channel, allowing the linkage to rotate around the retainer as the first fitting fluid flow port moves vertically between a first fitting engagement position and a first fitting disengagement position upon movement of the handle 175, which is attached to the housing via a retainer 177 such as a bolt or screw.

Figure 4:
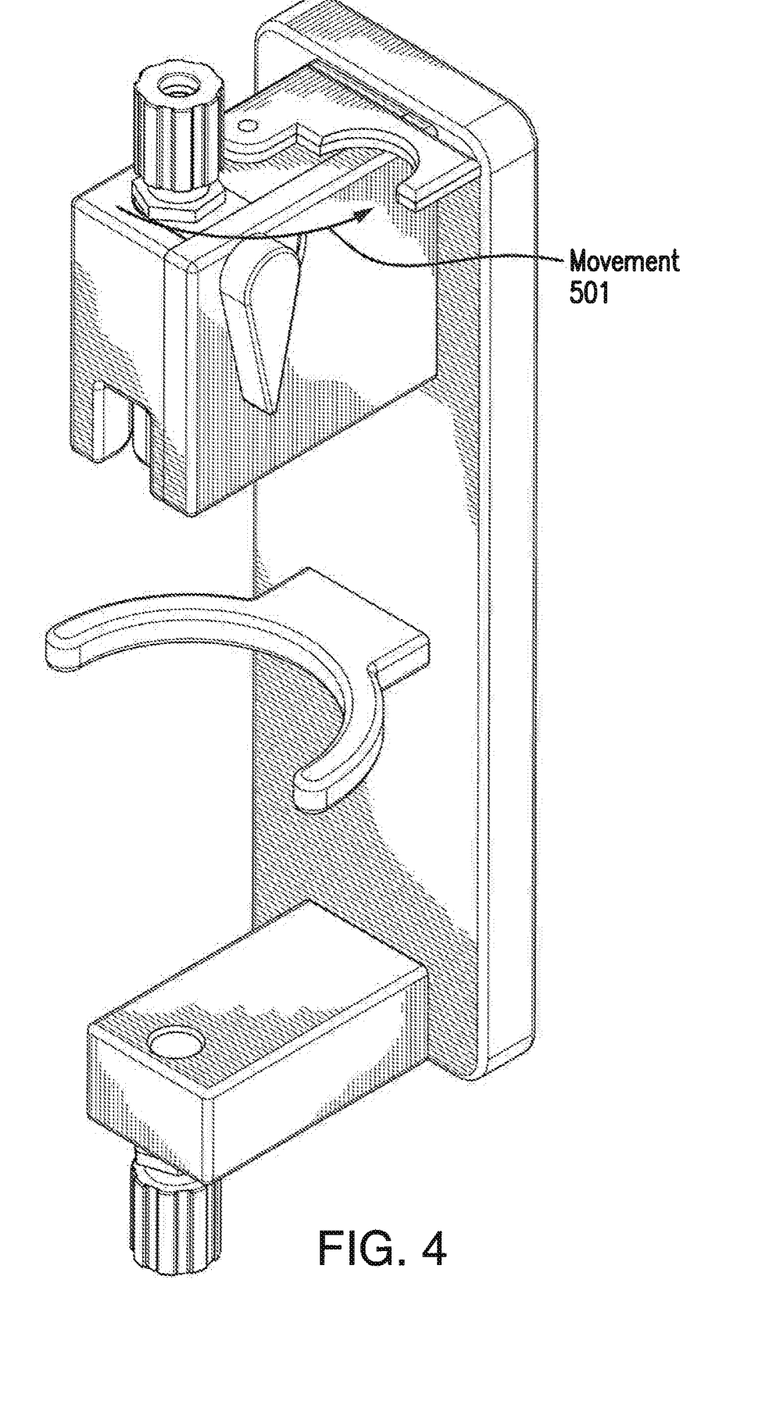
FIG. 4 is a perspective view of a manifold assembly shown in FIG. 1, wherein the latch mechanism has been pivoted to unlock the movable hollow fluid flow channel.
Figure 5:
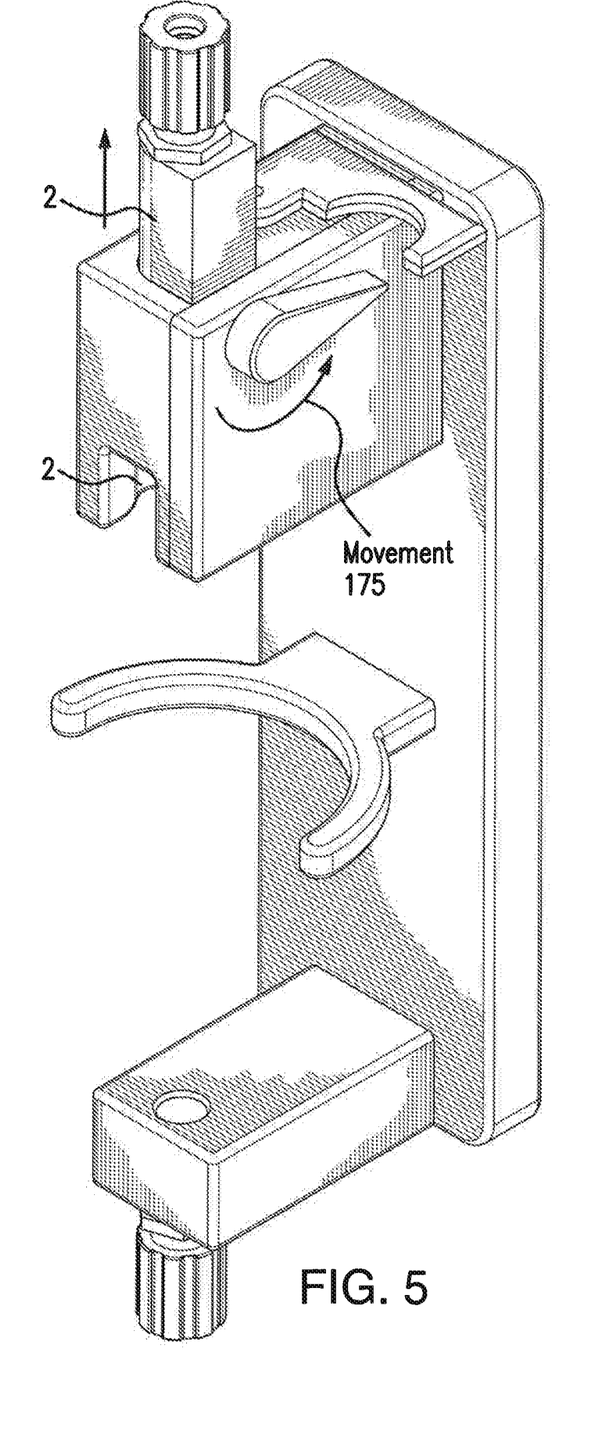
FIG. 5 is a perspective view of a manifold assembly shown in FIG. 4, wherein the unlocked movable hollow fluid flow channel has moved to the first fitting disengagement position upon movement of the handle.

The illustrated embodiment also includes a latch mechanism 500 comprising a movable plate 501, wherein the upper adjustable frame arrangement further comprises the movable plate including a portion 502 that can contact the movable hollow fluid flow channel and/or an element on the movable hollow fluid flow channel and prevent the movable hollow fluid flow channel from moving (as shown in FIG. 1), and can be moved away to allow the movable fluid flow channel to move (as shown in FIGS. 4 and 5). Preferably, the upper adjustable frame arrangement includes a pin or stud 503, and the movable upper plate includes a throughhole 504 such that the plate pivots about the pin or stud.

A variety of connection port fittings are suitable for use in accordance with embodiments of the invention, and are known in the art.

Figure 3A:
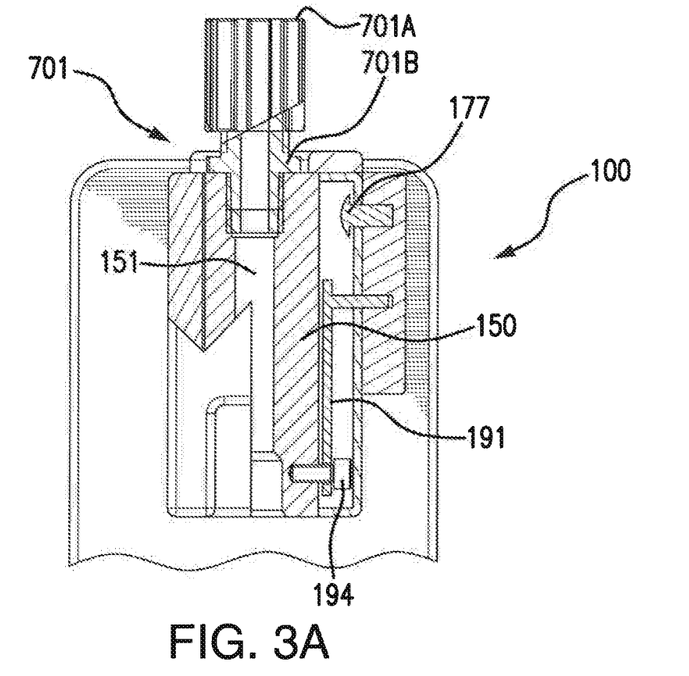
FIG. 3A is a cross-sectional view of the upper adjustable frame arrangement in the manifold assembly shown in FIG. 1, also showing the upper connection port fitting.
Figure 3B:
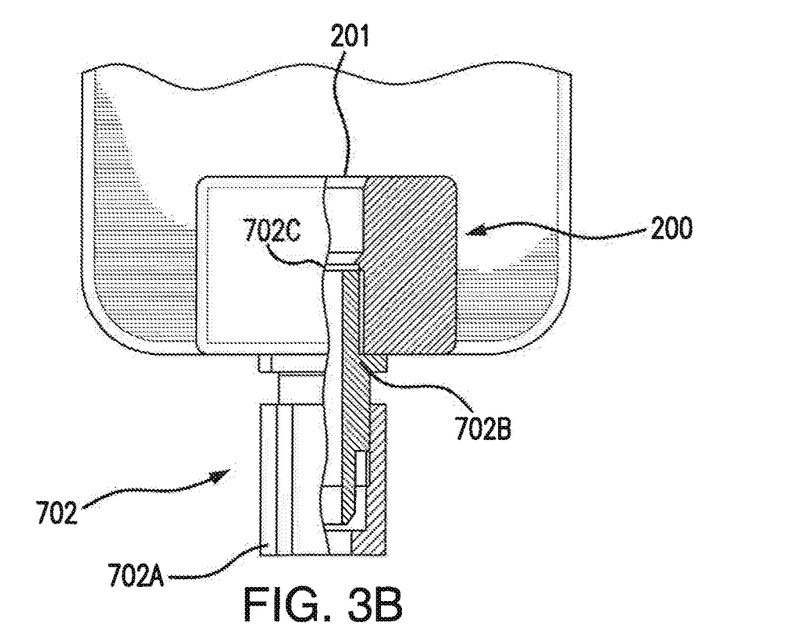
FIG. 3B is a cross-sectional view of the lower frame arrangement in the manifold assembly shown in FIG. 1, also showing the lower connection port fitting including a second fluid fitting fluid port, wherein the lower connection port fitting nut is also shown in cross-sectional view.
Figure 3C:
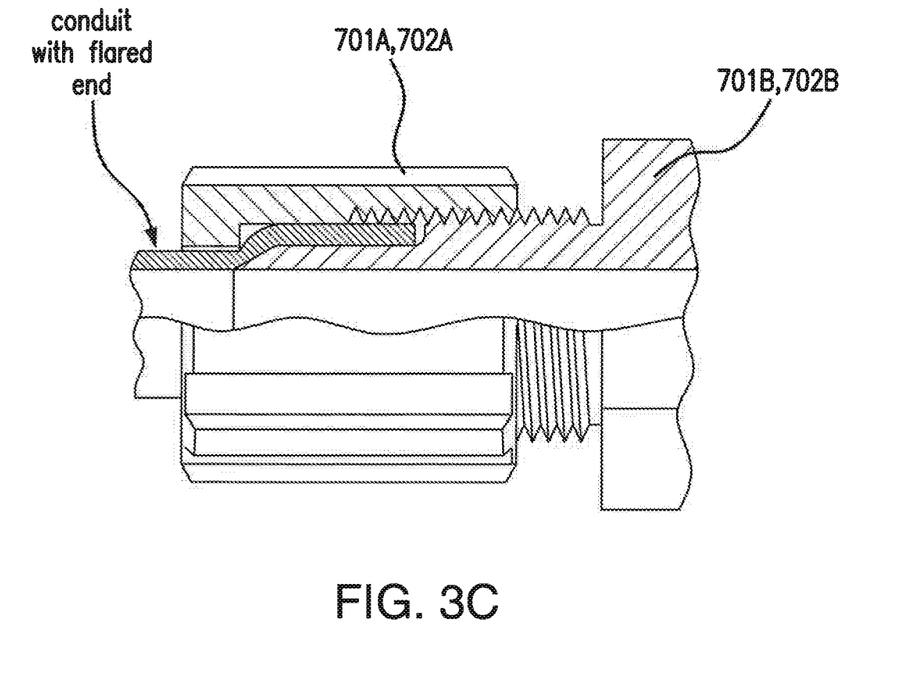
FIG. 3C shows a cross-sectional view of an illustrative connection port fitting connected to the manifold assembly, also including a portion of a conduit passing through the fitting, wherein the conduit is in fluid communication with the manifold assembly.

FIGS. 1, 3A, and 3B, show upper and lower connection port fittings 701 and 702, comprising, respectively, nuts 701A and 702A, and hollow bodies 701B and 702B. The illustrative hollow body shown in FIG. 3B includes a second fitting fluid flow port 702C. Typically, as shown in FIG. 3C, the hollow bodies and nuts include corresponding threads, and an end of a hollow body is configured to fit tightly into the interior diameter of a conduit (tubing; shown here with a flared end) such that the conduit can provide fluid communication with the manifold assembly when the nut is tightened on the threads of the hollow body. While not shown in the Figures, the hollow bodies can be attached to the frame arrangements as known in the art, e.g., by threads, press-fitting, etc.

Figure 6A:
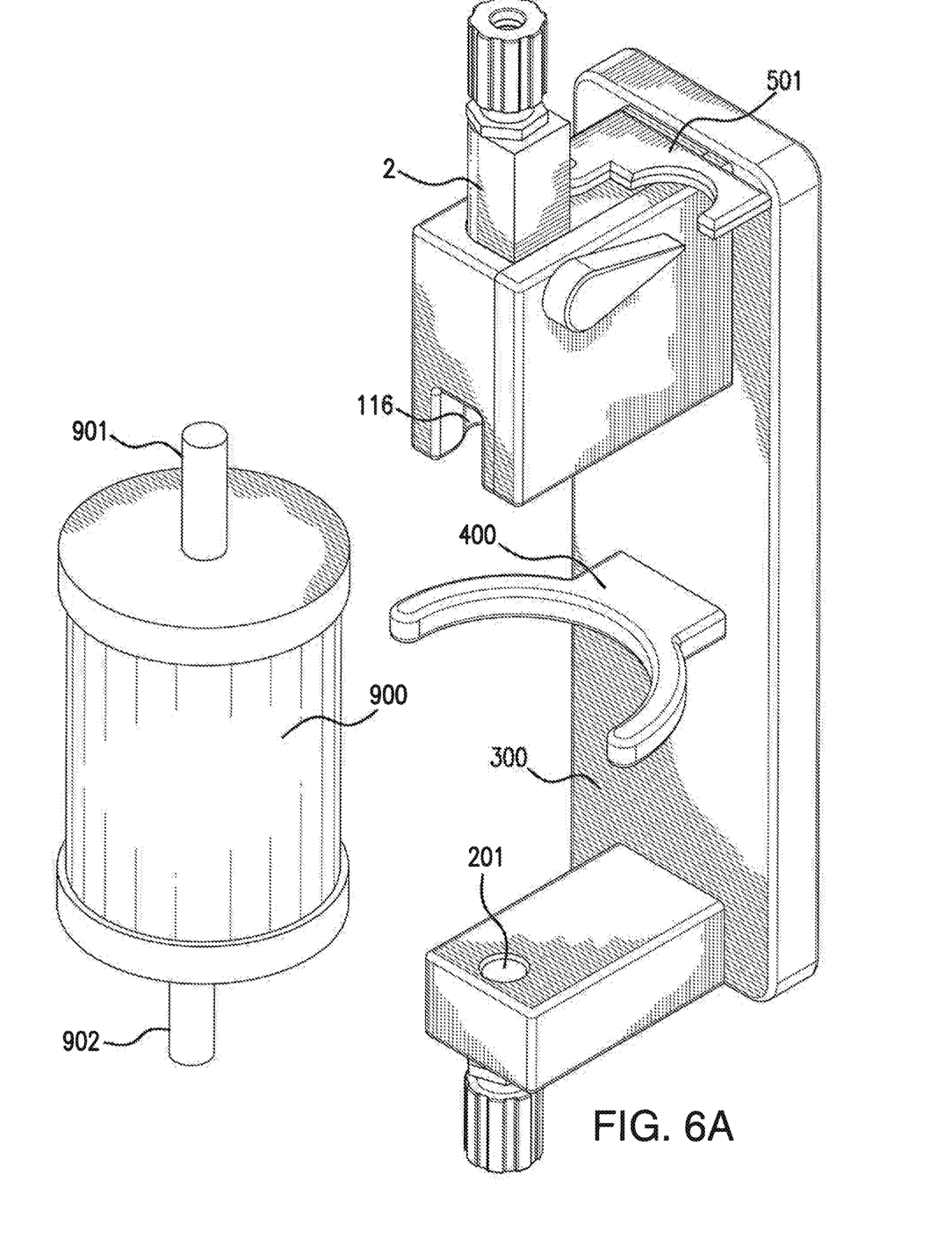
FIG. 6A shows a filter capsule having a first fitting and a second fitting before being placed in the manifold assembly shown in FIG. 5, wherein the movable hollow fluid flow channel including the first fitting fluid port is in the first fitting disengagement position.
Figure 6B:
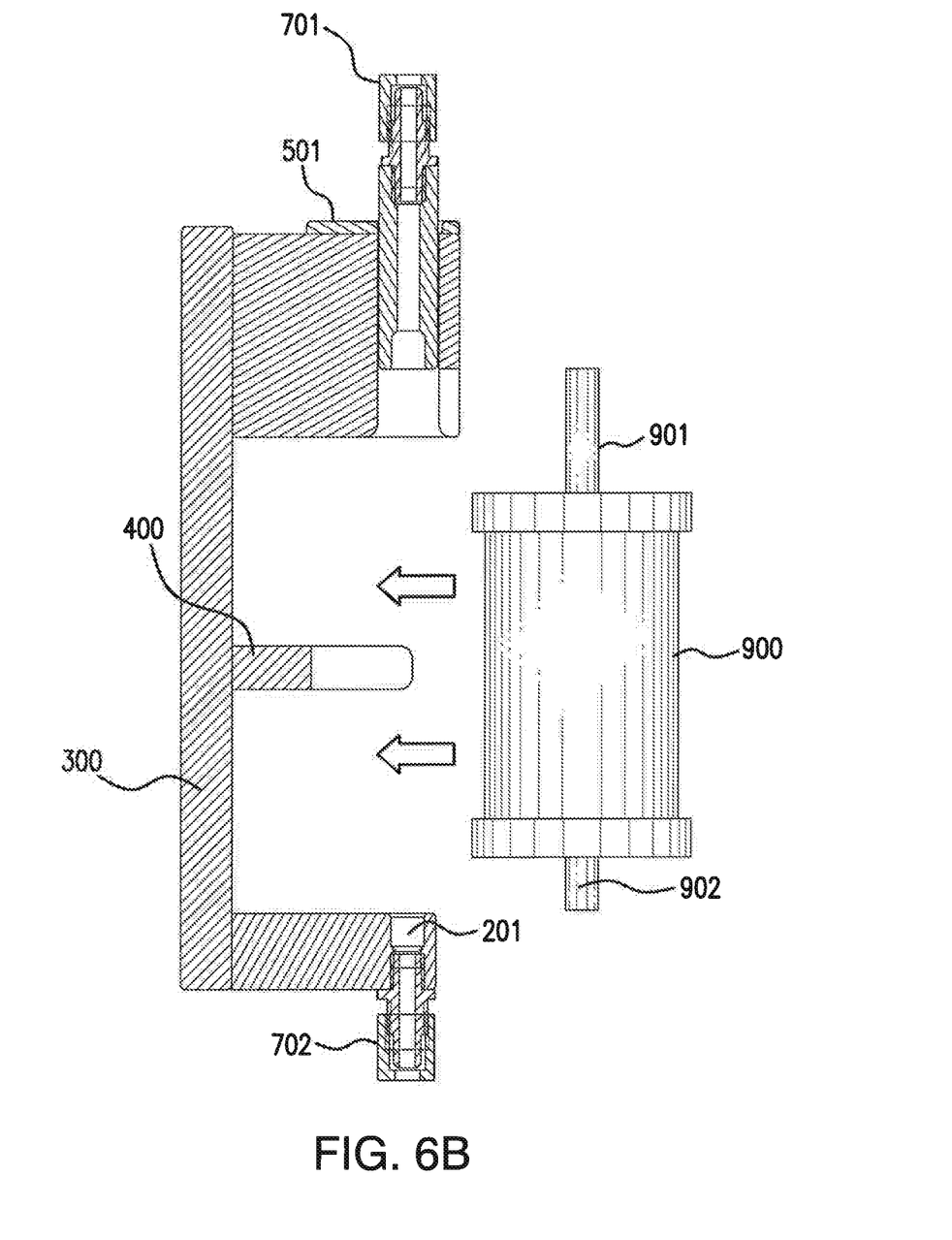
FIG. 6B shows, in side view, that the filter capsule is kept vertically and moved horizontally to be placed in the manifold assembly.

In accordance with an embodiment of a method for engaging a filter capsule in a manifold assembly, and using FIGS. 5, 6A, and 6B for initial reference (wherein the upper adjustable frame arrangement of the manifold assembly is in the first fitting disengagement position 2), a filter capsule 900 having a first fitting 901 and a second fitting 902 is placed into an embodiment of the manifold assembly, moving the filter capsule horizontally while kept vertically such that the first fitting is placed in the slot 116, and the filter capsule is subsequently moved downwardly while kept vertically such that the second fitting is placed in the through hole 201. Accordingly, the filter capsule can be inserted into the manifold assembly and engaged without rotating the filter capsule.

In those embodiments for use with a filter capsule having different configurations for the filter inlet fitting and the filter outlet fitting, the slot and through hole can be sized such that the filter capsule can only be installed one way in the manifold assembly, ensuring the correct orientation of the filter capsule during use.

While optional, a capsule filter housing support 400 is preferably present to help align the capsule filter housing when engaging with the manifold assembly. For ease of alignment, the support 400 preferably has a housing receiving configuration with arms 400A, 400B. In FIG. 1, the housing receiving configuration is shown as curved, for receiving the filter capsule as shown in FIGS. 6A-6D. However, the configuration can be adapted for other shapes of filter capsule housings.

Figure 6C:
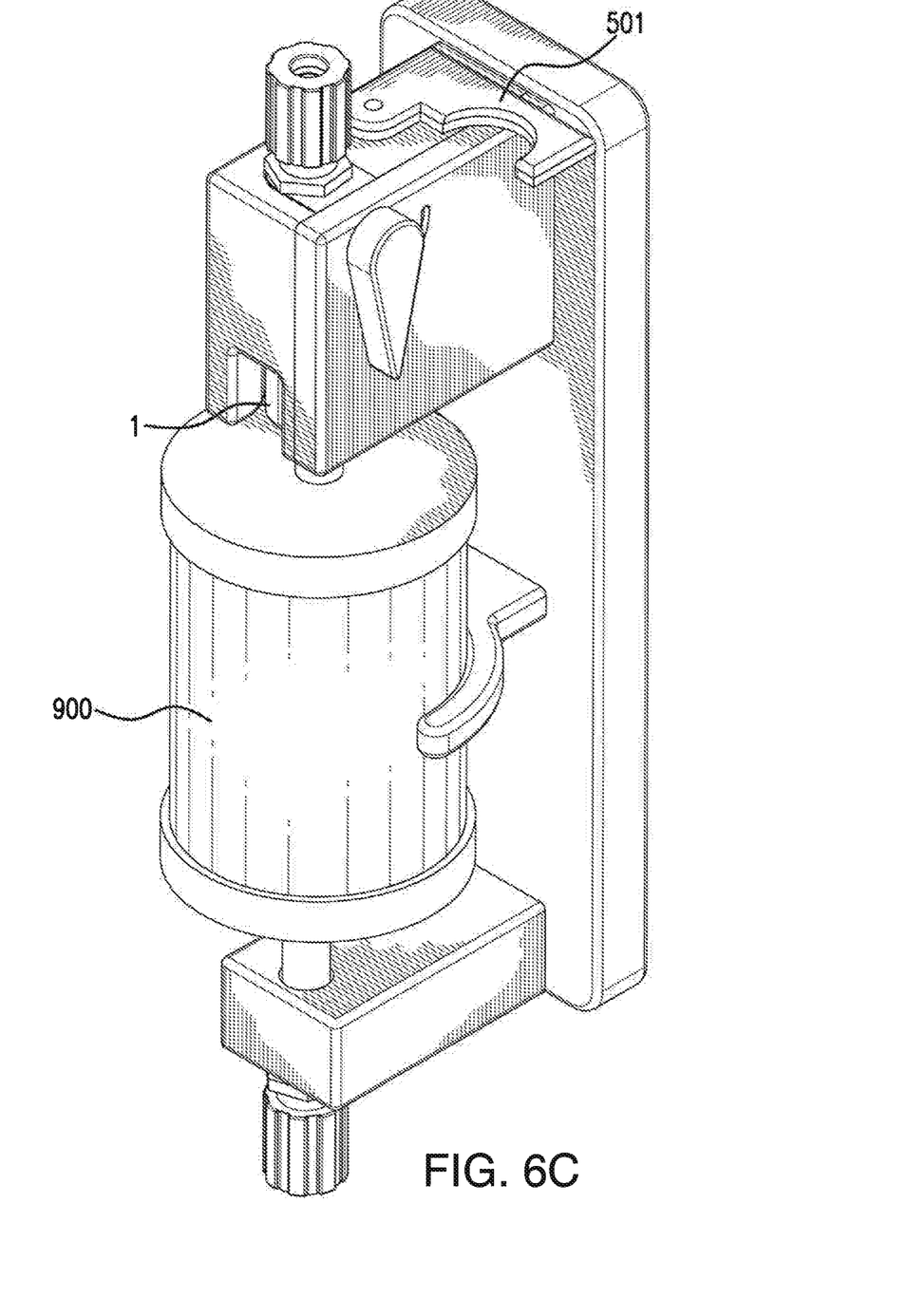
FIG. 6C shows the filter capsule placed in the manifold assembly shown in FIG. 1, wherein the movable hollow fluid flow channel including the first fitting fluid port is in the first fitting engagement position.
Figure 6D:
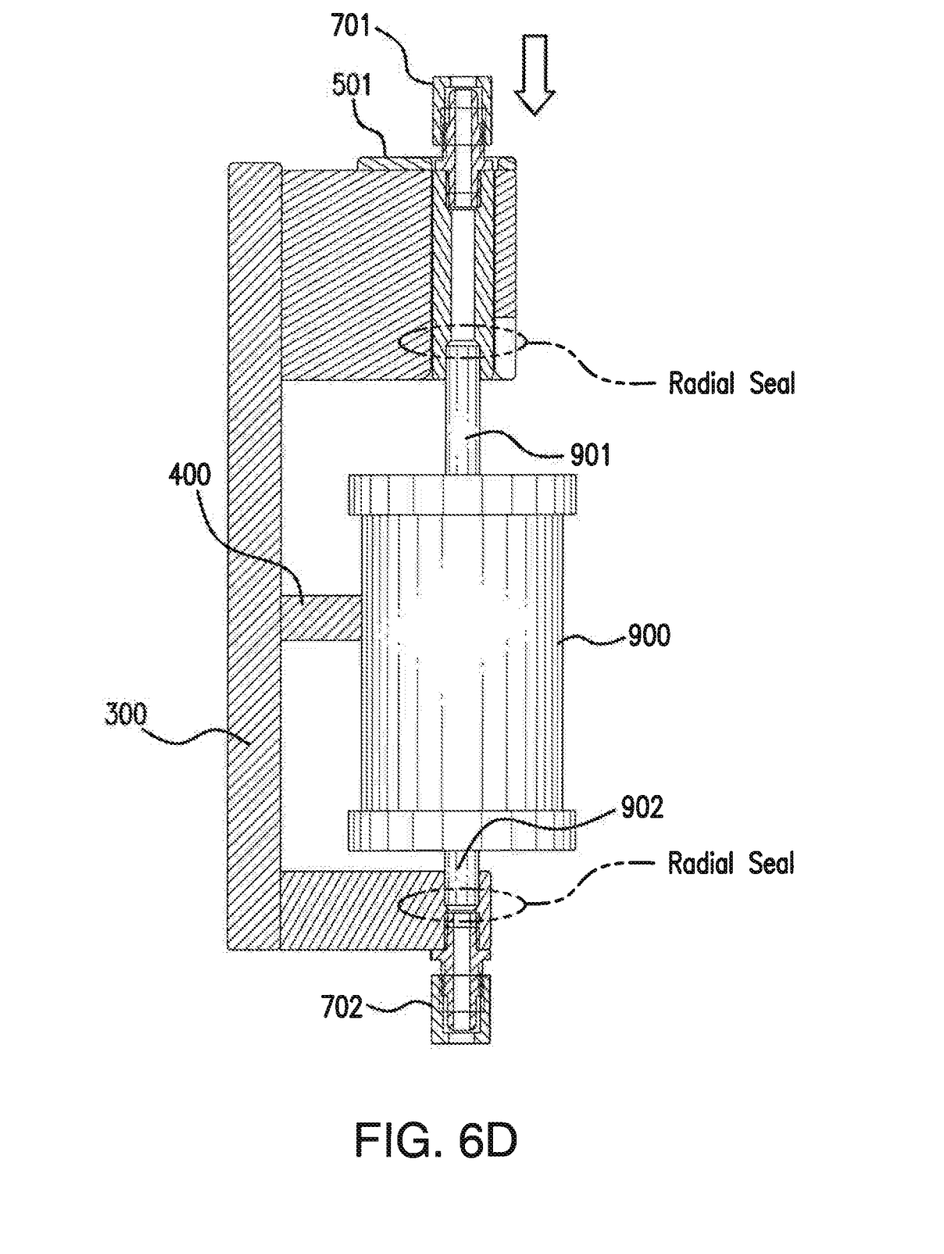
FIG. 6D shows, in a cross-sectional side view of the manifold assembly, that the movable hollow fluid flow channel including the first fitting fluid port has moved into in the first fitting engagement position, and the second fitting is engaged with the second fitting flow port.

Subsequently, using FIGS. 1, 6C, and 6D for reference, the handle 175 can be rotated, moving the movable hollow fluid flow channel in the upper adjustable frame arrangement downwardly in the direction of the lower frame arrangement. Once the manifold assembly is in the first fitting engagement position 1 (see FIGS. 6C and 6D), radial seals (see FIG. 6D) are formed between the first fitting of the capsule filter and the movable fluid flow channel (also including the first fitting fluid flow port) and between the second fitting of the capsule filter and the second fitting fluid flow port. Typically, the movable plate 501 rotated from the position shown in FIG. 4 to the position shown in FIG. 1 to prevent the movable fluid flow channel from upward movement.

Fluid can be passed through the filter capsule to filter the fluid. The filter capsule first fitting can be a filter inlet fitting or a filter outlet fitting. Typically, the filter capsule first fitting is an outlet fitting, such that, during filtration, the filtered fluid passes from the filter outlet fitting, and through the movable fluid flow channel and first fitting fluid flow port.

Once filtration is completed, the manifold can be placed in the first fitting disengagement position after moving the movable plate and the rotating the handle, and the filter capsule can be removed, and a new capsule inserted.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A manifold assembly for use with a filter capsule having a first fitting and a second fitting, the manifold assembly comprising:
   (a) an upper adjustable frame arrangement comprising a front wall having a top end and a bottom end, and a recess, the bottom end including a slot; a movable hollow fluid flow channel including a first fitting fluid flow port, a linkage, a curved cut out, and a rotatable handle, wherein the linkage engages with the rotatable handle though the curved cut-out, and the linkage is engaged with the movable hollow fluid flow channel and the rotatable handle, such that the first fitting fluid flow port is vertically movable in the recess with the movable hollow fluid flow channel between a first fitting engagement position and a first fitting disengagement position upon movement of the handle;
   (b) a lower frame arrangement comprising a through hole for receiving the second fitting;
   (c) a manifold frame connected to the upper adjustable frame arrangement and connected the lower frame arrangement; and,
   (d) a filter housing support connected to the manifold frame between the upper adjustable frame arrangement and the lower frame arrangement.

2. The manifold assembly of claim 1, wherein the upper adjustable frame arrangement further comprises a movable plate including a portion that can prevent the movable hollow fluid flow channel from moving.

3. The manifold assembly of claim 2, wherein the upper adjustable frame arrangement includes a pin, and the movable plate pivots about the pin.

4. The manifold assembly of claim 1, wherein the first fitting fluid flow port can be placed in fluid communication with a filter outlet port when the first fitting fluid flow port is in the first fitting engagement position.

5. A method for engaging a filter capsule in a manifold assembly, the method comprising placing a filter capsule having a first fitting and a second fitting into a manifold assembly comprising:
(a) an upper adjustable frame arrangement comprising a front wall having a top end and a bottom end, and a recess, the bottom end including a slot; a movable hollow fluid flow channel including a first fitting fluid flow port, a linkage, a curved cut out, and a rotatable handle, wherein the linkage engages with the rotatable handle though the curved cut-out, and the linkage is engaged with the movable hollow fluid flow channel and the rotatable handle, such that the first fitting fluid flow port is vertically movable in the recess with the movable hollow fluid flow channel between a first fitting engagement position and a first fitting disengagement position upon movement of the handle;
(b) a lower frame arrangement comprising a through hole for receiving the second fitting;
(c) a manifold frame connected to the upper adjustable frame arrangement and connected the lower frame arrangement;
(d) a filter housing support connected to the manifold frame between the upper adjustable frame arrangement and the lower frame arrangement;
placing the second fitting into the through hole of the lower frame arrangement;
placing the first fitting into the slot of the upper adjustable frame arrangement;
rotating the rotatable handle such that the movable hollow fluid flow channel including the first fitting fluid flow port is moved in the recess into first fitting engagement position, and,
forming radial seals between the first fitting and the movable hollow fluid flow channel and between the second fitting and a second fitting fluid flow port.

6. The method of claim 5, further comprising passing fluid through the filter capsule.

7. The manifold assembly of claim 2, wherein the first fitting fluid flow port can be placed in fluid communication with a filter outlet port when the first fitting fluid flow port is in the first fitting engagement position.

8. The manifold assembly of claim 3, wherein the first fitting fluid flow port can be placed in fluid communication with a filter outlet port when the first fitting fluid flow port is in the first fitting engagement position.

* * * * *